United States Patent
Schulze et al.

(10) Patent No.: US 12,142,974 B2
(45) Date of Patent: Nov. 12, 2024

(54) BRUSH-COMMUTATED DC ELECTRIC MOTOR WITH AN IMPROVED OSCILLATION BEHAVIOR

(71) Applicant: Maxon International AG, Sachseln (CH)

(72) Inventors: Jens Schulze, Giswil (CH); Eugen Elmiger, Sempach (CH); Kacper Emmrich, Lucerne (CH)

(73) Assignee: Maxon International AG, Sachseln (CH)

(*) Notice: Subject to any disclaimer, the term of this patent is extended or adjusted under 35 U.S.C. 154(b) by 247 days.

(21) Appl. No.: 17/786,351

(22) PCT Filed: Dec. 23, 2020

(86) PCT No.: PCT/EP2020/087765
§ 371 (c)(1),
(2) Date: Jun. 16, 2022

(87) PCT Pub. No.: WO2021/130312
PCT Pub. Date: Jul. 1, 2021

(65) Prior Publication Data
US 2023/0013171 A1 Jan. 19, 2023

(30) Foreign Application Priority Data

Dec. 23, 2019 (EP) .................. 19219406

(51) Int. Cl.
*H02K 13/10* (2006.01)
*H02K 1/12* (2006.01)
*H02K 1/27* (2022.01)

(52) U.S. Cl.
CPC .............. *H02K 13/10* (2013.01); *H02K 1/12* (2013.01); *H02K 1/27* (2013.01)

(58) Field of Classification Search
CPC .......... H02K 13/04; H02K 13/10; H02K 23/58
See application file for complete search history.

(56) References Cited

U.S. PATENT DOCUMENTS 3,191,081 A * 6/1965 Faulhaber .............. H02K 23/56
310/40 MM
5,374,867 A * 12/1994 Takehara ............... H02K 23/26
310/198

(Continued)

FOREIGN PATENT DOCUMENTS

DE 10355647 A1 7/2004
DE 102018101227 A1 * 7/2018

OTHER PUBLICATIONS

DE 102018101227 A1 Machine Translation (Year: 2018).*

(Continued)

*Primary Examiner* — Tran N Nguyen
*Assistant Examiner* — Masoud Vaziri
(74) *Attorney, Agent, or Firm* — Dickinson Wright PLLC; Steven C. Hurles

(57) ABSTRACT

The DC electric motor has a stator which comprises a permanent magnet with a number p of pole pairs, and has a rotor which can rotate in relation to the stator and has a hollow-cylindrical iron-free winding with a geometric axis and a number Q of sub-coils, and a collector with a number K of collector segments, wherein the sub-coils are arranged distributed over the periphery of the rotor. The brush-commutated DC electric motor furthermore has at least one pair of brushes which are in contact with the collector and by means of which the sub-coils are energized. The arrangement of the brushes and the interconnection of the sub-coils are selected in such a way that in each case a number n≥2 of sub-coils, which are each arranged offset by 360°/n in a rotationally symmetrical manner with respect to the axis of (Continued)

the rotor, are always supplied with the same current at the same time.

11 Claims, 6 Drawing Sheets

(56) References Cited

U.S. PATENT DOCUMENTS

| | | | |
|---|---|---|---|
| 2004/0145268 A1* | 7/2004 | Yamamoto | H02K 23/30 |
| | | | 310/249 |
| 2010/0102665 A1 | 4/2010 | Comte | |
| 2013/0099718 A1* | 4/2013 | Bruhn | H02K 23/66 |
| | | | 310/248 |
| 2013/0249344 A1* | 9/2013 | Folmli | H02K 3/47 |
| | | | 310/184 |
| 2017/0149313 A1* | 5/2017 | Schulze | H02K 13/10 |

OTHER PUBLICATIONS

Tadao Yamaguchi, "Coreless Motor Developments Keep Pace with Expanding Applications", Jee Journal of Electronic Engineering, Dempa Publications Inc., Tokyo, JP, Bd. 31, No. 331, Jul. 1, 1994 (Jul. 1, 1994), pp. 45-47, XP000438054, ISSN: 0385-4507, p. 46; Figure 2.

* cited by examiner

BRUSH-COMMUTATED DC ELECTRIC MOTOR WITH AN IMPROVED OSCILLATION BEHAVIOR

CROSS-REFERENCE TO RELATED APPLICATION

This application claims priority to and the benefit of PCT Patent Application No. PCT/EP2020/087765 filed on 23 Dec. 2020, entitled "BRUSH-COMMUTATED DC ELECTRIC MOTOR WITH AN IMPROVED VIBRATION BEHAVIOR" and European Patent Application No. 19219406.6, filed on 23 Dec. 2019, entitled "BRUSH-COMMUTATED DC ELECTRIC MOTOR WITH AN IMPROVED VIBRATION BEHAVIOR".

BACKGROUND

1. Field

The present disclosure relates to a brush-commutated DC electric motor.

2. Related Art

A generic brush-commutated DC electric motor has a stator which comprises a permanent magnet with a number p of pole pairs, and a rotor which can rotate in relation to the stator, which has a hollow-cylindrical iron-free winding with a geometric axis and a number Q of sub-coils, and a collector with a number K of collector segments, wherein the sub-coils are arranged distributed over the periphery of the rotor, and wherein the brush-commutated DC electric motor furthermore has at least one pair of brushes which are in contact with the collector and by means of which the sub-coils are energized.

The stator of such a brush-commutated electric motor can have a cylindrical permanent magnet which is arranged inside the hollow-cylindrical iron-free winding. At the outside, there normally is a magnetically conductive return sleeve which simultaneously serves as the housing of the electric motor. Due to the iron-free winding, such electric motors do not have any cogging torque, so that a jerk-free run is possible even at low speeds. This involves few vibrations and noise. Due to the lacking iron in the rotor, there are no iron losses, and a constantly impressed magnetization takes place. This leads to high efficiency. Moreover, the generated torque remains proportional to the motor current even at high currents. The low inertia of masses of the rotor which leads to high dynamics and short run-up times is also advantageous.

Although brush-commutated DC electric motors are broadly used and typically have a good operational behavior, it showed in practice that oscillations in the region of the collector occasionally occur, whereby the current is modulated which, as a consequence, leads to an in-crease of the oscillations by this feedback, as in brush-commutated DC electric motors, during commutation, the current of a sub-coil is initially blocked by short-circuiting the same via the brush and is subsequently set up again with an opposite sign. In particular in case of two-pole motors with chorded or chamfered sub-coils, a diametrically resulting force or a torque acting transversely to the axis of rotation is involved. Both effects can deflect the rotor in a radial direction at the point of the collector.

A brush-commutated DC electric motor according to the preamble of independent claim 1 is known, for example, from EP 3171498 B1. This document deals with the attempt of countering the above-illustrated effects by arranging the coil plane of a sub-coil rotated about the axis of the rotor by a correction angle between 45° and 135° in relation to the collector plane of the associated collector segments. However, it turned out that the oscillations and the resulting modulations of the current cannot be completely prevented thereby.

Therefore, the object of the present disclosure is to provide a generic brush-commutated DC electric motor wherein the illustrated problems are prevented as completely as possible.

The object is achieved by the features of independent claim 1. Accordingly, in a brush-commutated DC electric motor according to the preamble of independent claim 1, a solution of the problem according to the disclosure is given if the arrangement of the brushes and the interconnection of the sub-coils are selected in such a way that in each case a number n≥2 of sub-coils, which are each arranged offset by 360°/n in a rotationally symmetrical manner with respect to the axis of the rotor, are always supplied with the same current at the same time.

This is to be understood such that each one of the n≥2 sub-coils which are each arranged offset in a rotationally symmetrical manner is mapped on itself by a rotation by 360°/n about the axis of the rotor. An exact mapping of a sub-coil on itself is here, of course, only given if the sub-coils have a uniform shape according to the preferred embodiment illustrated below. The "same current" means the amount of the current. The sub-coils through which the "same current" flows can therefore be connected either in series or in parallel.

In an advantageous embodiment, the sub-coils have a uniform shape at least in one projection on an envelope of the hollow-cylindrical iron-free winding.

To prevent oscillations as completely as possible, it is advantageous for the shape of the individual coils to be completely uniform. The uniform design of the sub-coils is completely variable. Suited shapes are known, for example, from EP 1780871 A1, DE 1801263 A1, and DE 1188709 B. Current can flow in the same direction through the n coils, which are arranged in a rotationally symmetrical manner with respect to each other and which are supplied with the same current at the same time. However, embodiments are also possible in which current can flow in opposite directions through the n coils, which are arranged in a rotationally symmetrical manner with respect to each other and which are supplied with the same current at the same time. As the brushes, graphite brushes are preferably employed. The hollow-cylindrical iron-free winding is preferably self-supporting, and the sub-coils are preferably not wound upon a core or the like.

Further preferred embodiments of the present disclosure are the subject matter of the subclaims.

To supply the n sub-coils with the same current, according to one embodiment of the present disclosure, the n sub-coils, which are each arranged in a rotationally symmetrical manner with respect to each other and which are always energized at the same time, can be connected in series. The connection of the sub-coils connected in series can be accomplished via the coil wire itself or via the collector. In the latter case, the connection of the sub-coils connected in series is preferably realized via a collector circuit board of the collector.

The supply with the same current can also be achieved in that the beginning and the end of the n sub-coils are each on the same electric potential if a magnetic flux of the same amplitude and phase always flows through the sub-coils by symmetry. According to an alternative embodiment of the present disclosure, the n sub-coils, which are each arranged in a rotationally symmetrical manner with respect to each other and are always energized at the same time, can be connected in parallel.

The disclosure is particularly suited for brush-commutated DC electric motors with one single pole pair. According to one embodiment of the present disclosure, the number p of pole pairs is thus 1, wherein the collector has an uneven number $K \geq 3$ of collector segments, wherein the number Q of sub-coils is $2 \cdot K$, and wherein the number n of the sub-coils, which are each arranged in a rotationally symmetrical manner with respect to each other and are always energized at the same time, is 2. The two coils energized at the same time are diametrically opposed and preferably connected in series. According to a particularly preferred and easy-to-realize embodiment of the present disclosure, each sub-coil is in this case connected at one end with a collector segment, and at the respective other and, with the diametrically opposed sub-coil.

The disclosure is also suited for brush-commutated DC electric motors with more than one pole pair. According to one embodiment of the present disclosure, the number p of pole pairs is thus greater 1, wherein the collector has a number $K = k \cdot p$ of collector segments, wherein k is an uneven number $\geq 3$, wherein the number Q of sub-coils is $q \cdot p$, wherein the number q either corresponds to the number k or to the double of the number k, and wherein the number n of the sub-coils which are each arranged in a rotationally symmetrical manner with respect to each other and are each energized at the same time corresponds to the number p, if $q=k$, or corresponds to the double of p, if $q=2 \cdot k$, wherein a number p of collector segments each, which are also arranged offset by $360°/p$ each in a rotationally symmetrical manner with respect to the axis of the rotor, are interconnected on the rotor's side in a conductive manner.

According to a further particularly preferred embodiment of the present disclosure, the two brushes of the pair of brushes each have a width corresponding to the sum of one half collector pitch and the distance between two collector segments, wherein the two brushes are arranged such that the beginning of the commutation process of the one brush of the pair occurs simultaneously with the termination of the commutation process of the respective other brush of the pair. Thereby, the negative effects illustrated above are further reduced. The width of the brushes means the width directly at the periphery of the collector, accordingly at the contact surface between the brush and the collector. The actual width thus corresponds to the chord resulting from half the pitch and the distance.

In brush-commutated DC electric motors having more than one single pole pair, according to a further particularly preferred embodiment of the present disclosure, the pair of brushes can furthermore be a first pair of brushes, wherein the brush-commutated DC electric motor furthermore comprises at least one further pair of brushes which are also in contact with the collector, wherein the two brushes of the further pair of brushes each have a width which is smaller than the width of the brushes of the first pair of brushes. It is here particularly advantageous for the brushes of the at least one further pair of brushes to consist of a material which has a higher conductance than the material of which the brushes of the first pair of brushes consists.

Thereby, the current is reduced to a greater extent before the end of commutation, thus reducing the tendency towards sparking. Moreover, additional losses by an already occurring induced voltage during the commutation are reduced with the material which has a better conductivity. By the use of a brush with a material having a higher conductivity, the losses due to the brush transition resistance are furthermore reduced.

According to a further particularly preferred embodiment of the present disclosure, all sub-coils have the same shape. Thereby, the negative effects described in the beginning can be avoided in the most effective way.

As already mentioned above, the disclosure is particularly suited for brush-commutated DC electric motors whose rotor has sub-coils which are designed in a chorded and/or chamfered manner in relation to the axis of the rotor.

BRIEF DESCRIPTION OF DRAWINGS

Embodiments of the present disclosure will be illustrated more in detail below with reference to drawings.

In the drawing.

DESCRIPTION OF EMBODIMENTS

Figure 1:
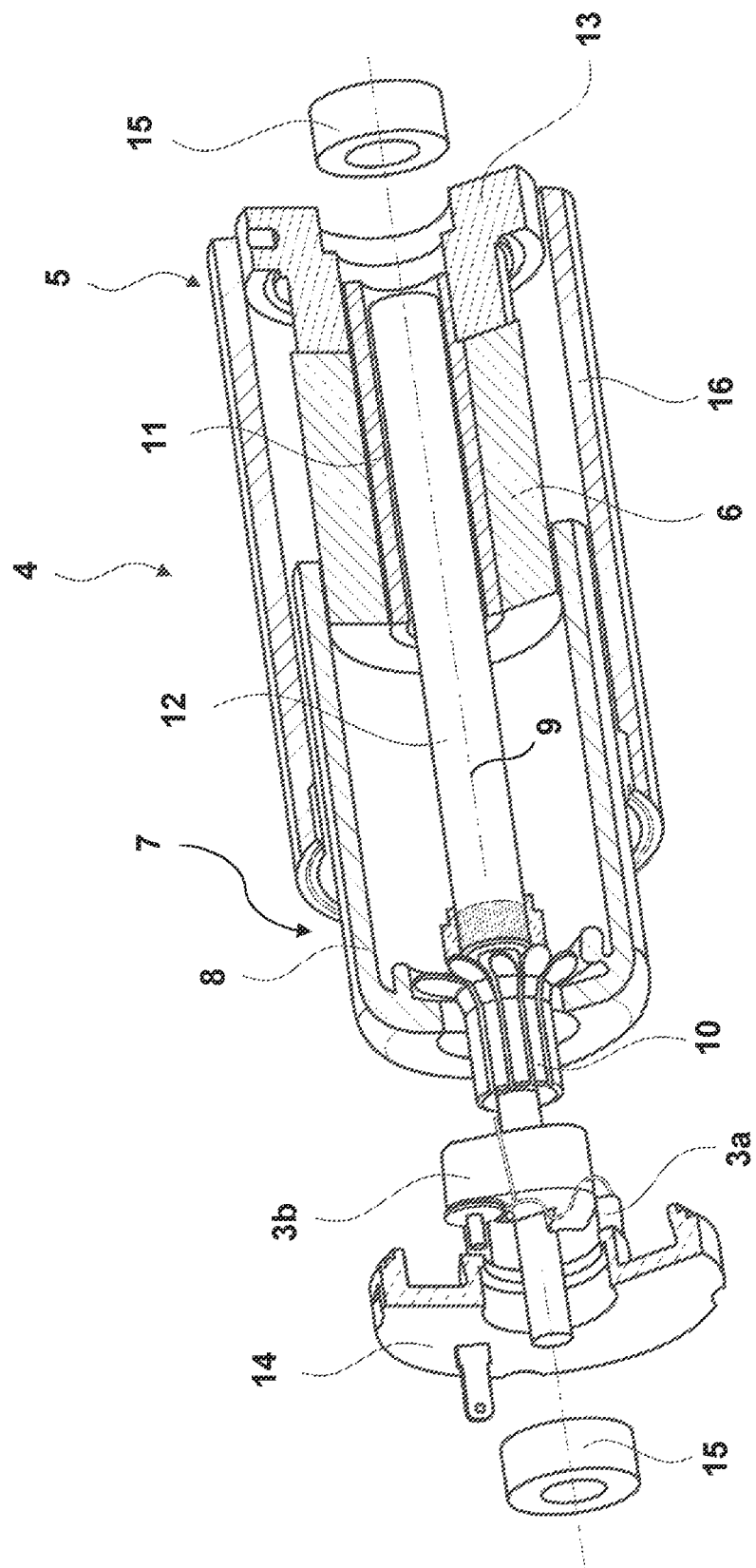
FIG. 1 shows a schematic exploded view of a brush-commutated DC electric motor.

In the following illustrations, equal parts are designated by equal reference numerals. If a figure contains reference numerals which are not discussed in greater detail in the pertaining description of the figures, reference is made to preceding or following descriptions of the figures.

With respect to FIG. 1, first of all, the general structure of a brush-commutated DC electric motor 4 is illustrated. The substantial components of a DC electric motor 4 with an iron-free winding are the stator 5 and the rotor 7 rotatably mounted with respect to the stator. The stator 5 includes, as substantial components, a permanent magnet 6 which can be of a hollow-cylindrical design, a flange 13 positioning the permanent magnet 6, a magnetic return 16 consisting of iron and serving as a housing, and a further flange 14 which serves as a brush or housing cover and to which two collector brushes 3a and 3b are attached in a pivoting manner in the shown example embodiment. The positioning of the permanent magnet 6 with respect to the flange 13 is accomplished by means of a sleeve 11 in the represented case. Ball bearings 15 which serve to rotatably mount the shaft 12 of the rotor 7 are arranged in the flanges 13 and 14. Apart from the shaft 12 with its geometric axis 9, the rotor 7 comprises, as substantial components, a self-supporting hollow-cylindrical iron-free winding 8 and a collector 10 consisting of a plurality of collector segments and connected with the winding. The self-supporting hollow-cylindrical iron-free winding 8 rotates within the air gap between the surface area of the permanent magnet 6 and the inner surface of the return 16.

The hollow-cylindrical iron-free winding 8 consists of a plurality of sub-coils of the same shapes. According to the disclosure, the arrangement of the brushes and the interconnection of the sub-coils are selected in such a way that in each case, a number n≥2 of sub-coils, which are each arranged offset by 360°/n in a rotationally symmetrical manner with respect to the axis of the rotor, are supplied with the same current at the same time.

Figure 2:
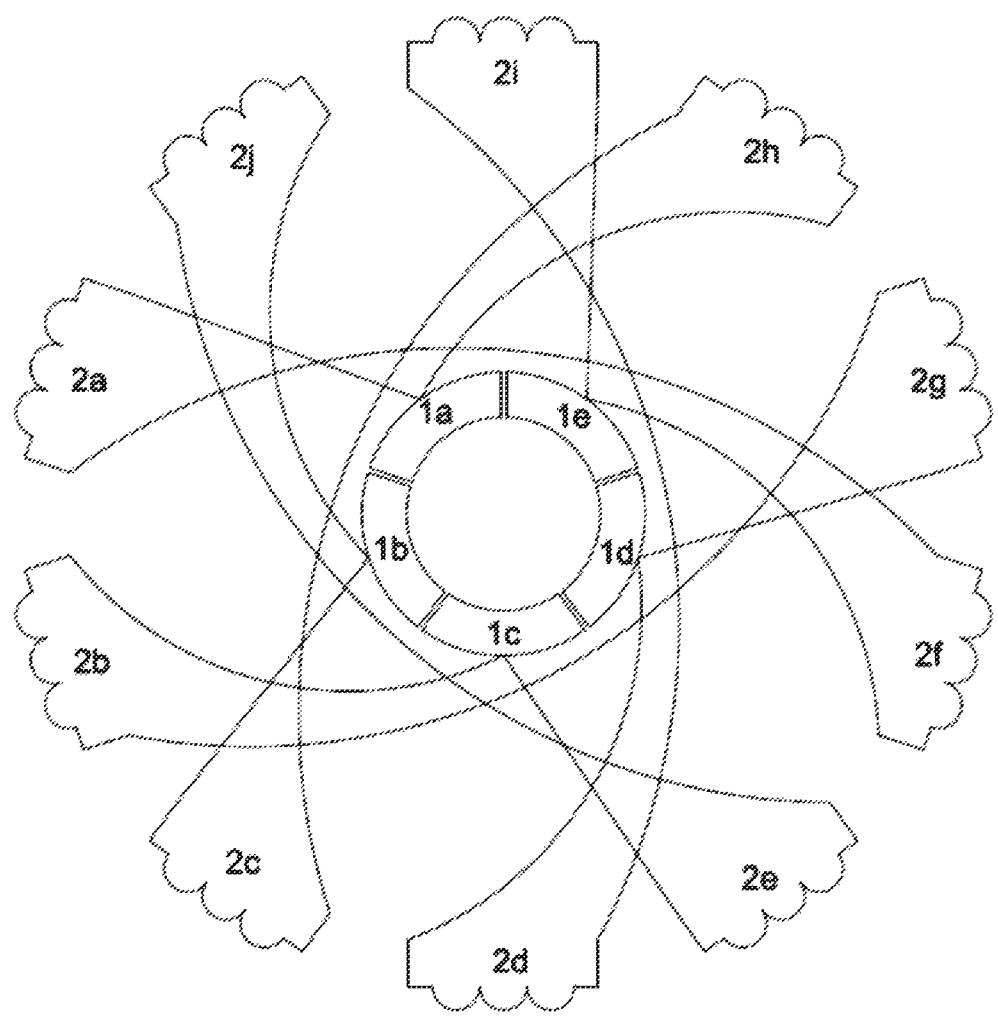
FIG. 2 shows a schematic representation of the sub-coil interconnection of a two-pole brush-commutated DC electric motor according to a first embodiment of the present disclosure.
Figure 3:
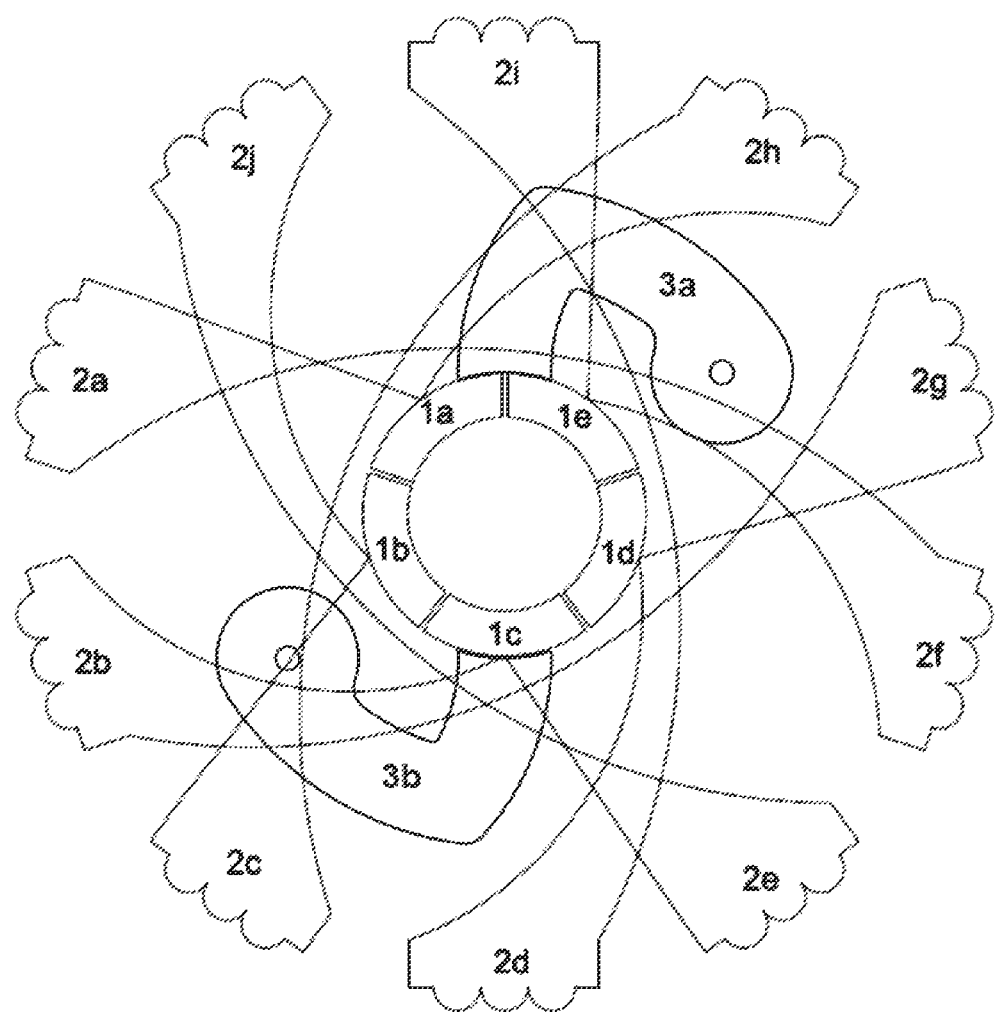
FIG. 3 shows the representation of FIG. 2 with additionally represented brushes.

One embodiment in this respect is illustrated by the schematic representation of the coil interconnection in FIGS. 2 and 3. In the shown embodiment, the non-depicted stator has a diametrically magnetized, two-pole permanent magnet. The rotor has altogether ten sub-coils (2a, 2b, 2c, 2d, 2e, 2f, 2g, 2h, 2i, 2j), the collector having five collector segments (1a, 1b, 1c, 1d, 1e). The sub-coils form five pairs (2a, 20, (2c, 2h), (2e, 2j), (2g, 2b), (2i, 2d) of sub-coils each arranged in a point-symmetrical manner with respect to the rotor axis and connected in series. To this end, each sub-coil is connected to a collector segment at one end, and at the respective other end, it is connected with the diametrically opposed sub-coil. Thus, the same current each flows through diametrically opposed sub-coils due to the forced connection. It is pointed out that the picture is only of a schematical type. The sub-coils are represented by the symbol for coils. In the representation, all connections to the collector segments are to be understood as electrical connections, all line crossings, however, not as electrical connections.

Energization is effected via the two collector brushes 3a and 3b represented in FIG. 3 which are preferably designed as graphite brushes. It is particularly advantageous for the two brushes 3a and 3b to each have a width corresponding to the sum of half a collector pitch and the distance between two collector segments, wherein the two brushes 3a, 3b are arranged such that the beginning of the commutation process of the one brush occurs simultaneously with the termination of the commutation process of the respective other brush.

Figure 4:
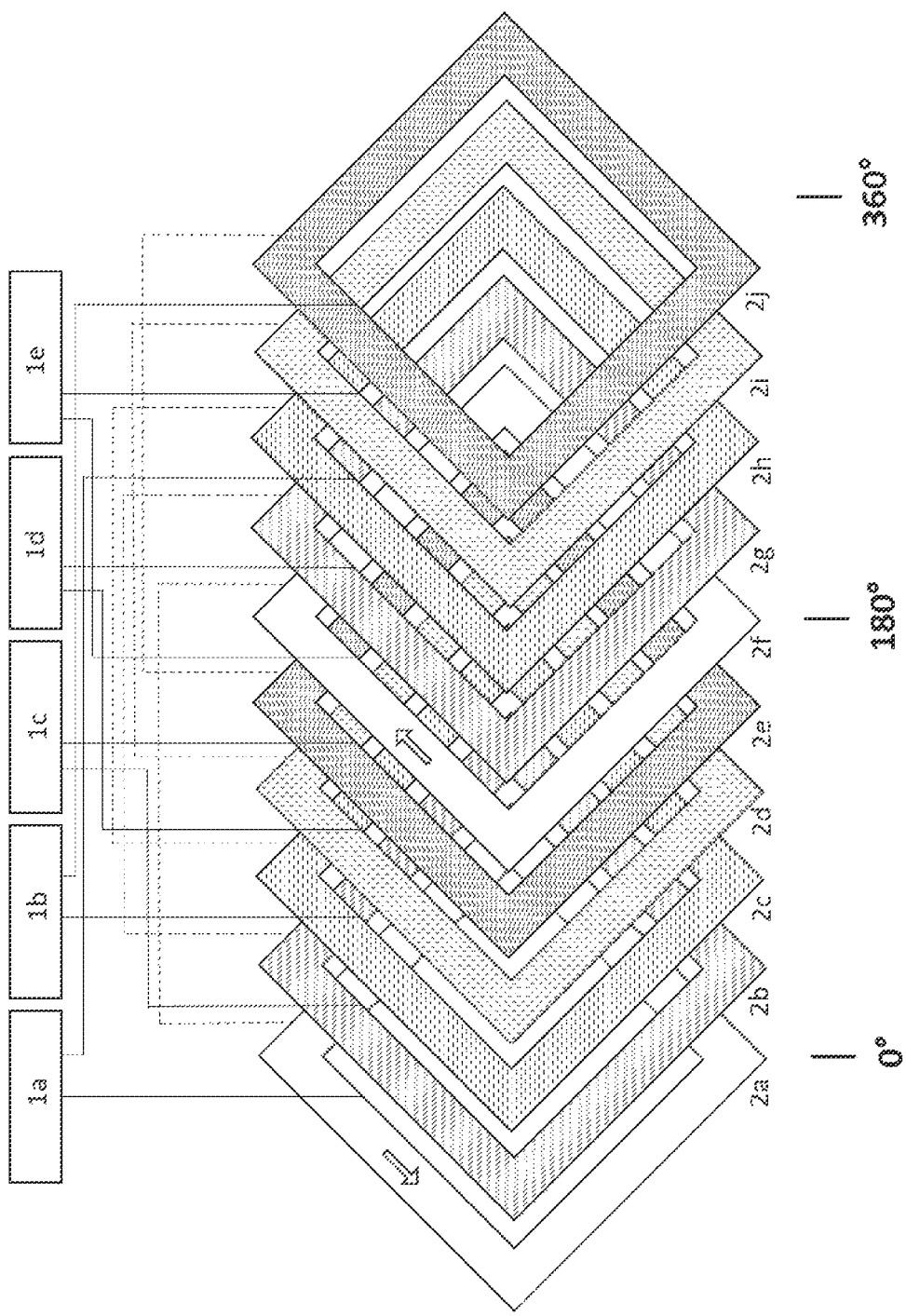
FIG. 4 shows an unwinding of the hollow-cylindrical iron-free winding of the embodiment of FIGS. 2 and 3 with a representation of the winding geometry and the associated interconnection of the individual sub-coils.

FIG. 4 shows an unwinding of the hollow-cylindrical iron-free winding of the embodiment of FIGS. 2 and 3 with a representation of the winding geometry and the associated interconnection of the individual sub-coils. The solid lines illustrate the connections between the collector segments (1a, 1b, 1c, 1d, le) and the sub-coils (2a, 2b, 2c, 2d, 2e, 2f, 2g, 2h, 2i, 2j). The broken lines illustrate the electrical connections between the sub-coils of each pair of sub-coils. The connections between the sub-coils of each pair of sub-coils can be accomplished via the coil wire itself or via the collector circuit board. For the pair of coils (2a, 2f), the current direction in the two sub-coils (2a, 2f), which are each arranged offset by 180° with respect to each other in a rotationally symmetrical manner, is illustrated by the two arrows shown in FIG. 4. In this embodiment, current consequently flows in opposite directions in the two sub-coils (2a, 2f), when viewing the respective sub-coil each in the viewing direction from the outside onto the envelope of the hollow-cylindrical iron-free winding, that means clockwise in one of the two sub-coils, and counter-clockwise in the other one of the two sub-coils.

Figure 5:
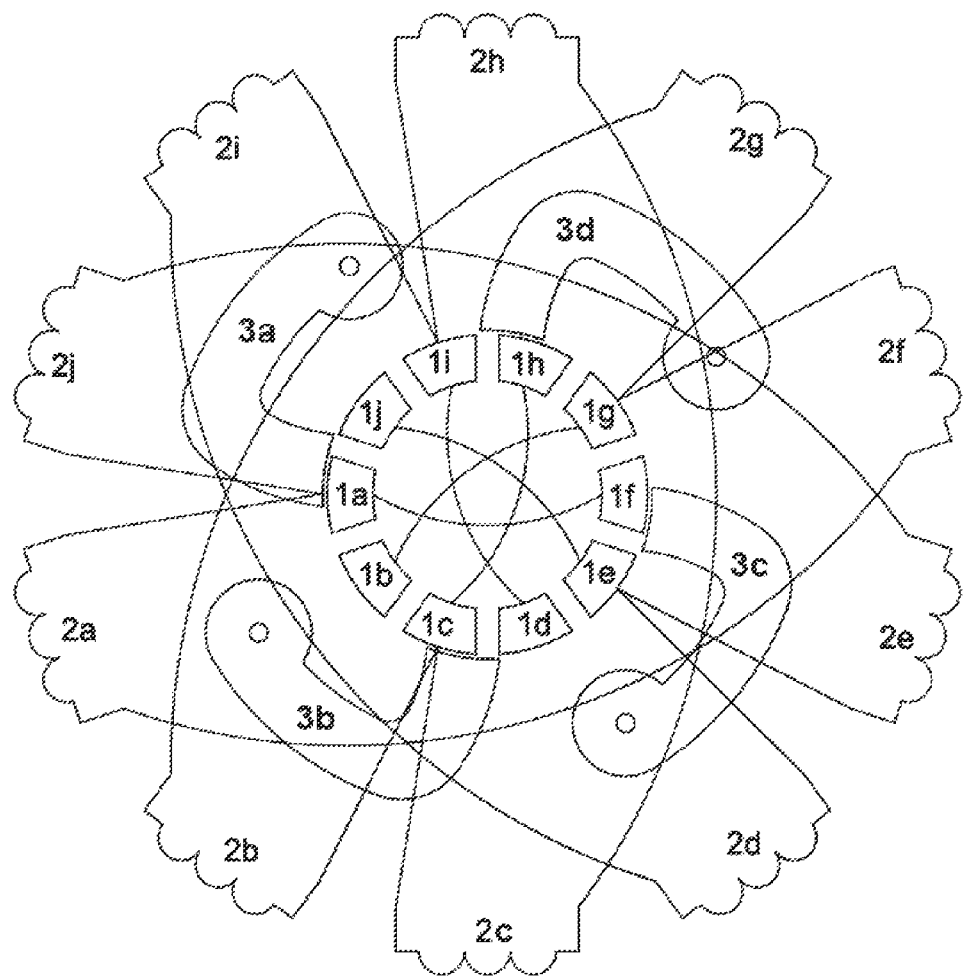
FIG. 5 shows a schematic representation of the sub-coil interconnection of a four-pole brush-commutated DC electric motor according to a second embodiment of the present disclosure.

FIG. 5 shows a circuit diagram for the rotor of an inventive four-pole DC electric motor with ten collector segments (1a, 1b, 1c, 1d, 1e, 1f, 1g, 1h, 1i, 1j) and ten sub-coils (2a, 2b, 2c, 2d, 2e, 2f, 2g, 2h, 2i, 2j). The sub-coils form five pairs (2a, 20, (2c, 2h), (2e, 2j), (2g, 2b), (2i, 2d) of sub-coils which are each arranged in a point-symmetrical manner with respect to the rotor axis and which are connected in series, and whose both ends are each connected with a pair of collector segments in a conductive manner. The each opposed collector segments are interconnected into five pairs (1a, 1f), (1c, 1h), (1e, 1j), (1g, 1b), (1i, 1d), so that they are on the same electrical potential by forced connection. Current flows in the same direction through the sub-coils of one pair of sub-coils in this example embodiment, in contrast to the example embodiment of FIGS. 2 to 4.

Since opposed collector segments are connected to each other, even the represented four-pole electric motor can be basically operated only with one pair of brushes. In the represented preferred design, the DC electric motor is, however, equipped with two pairs of brushes. Preferably, the same number of pairs of brushes as the number of pairs of poles should be employed in general. In the shown example embodiment, the first pair of brushes 3a, 3b is designed, analogously to the example embodiment of FIG. 3, in such a manner that the width of the brushes 3a, 3b approximately corresponds to the sum of one half collector pitch and the distance between two collector segments, wherein the two brushes 3a, 3b are arranged such that the beginning of the commutation process of the one brush 3a occurs simultaneously with the termination of the commutation process of the respective other brush 3b. The brushes 3a, 3b of the first pair of brushes consist of a material with a relatively low conductance. The second pair of brushes 3c, 3d is designed to be somewhat narrower and consists of a material having a higher conductance. Thereby, the current is reduced to a greater extent before the end of commutation, thus reducing the tendency towards sparking. Moreover, additional losses by an induced voltage already occurring during the commutation are reduced with the material which has a better conductivity. By the use of a brush with a material having a higher conductivity, losses due to the brush transition resistance are furthermore reduced.

Figure 6:
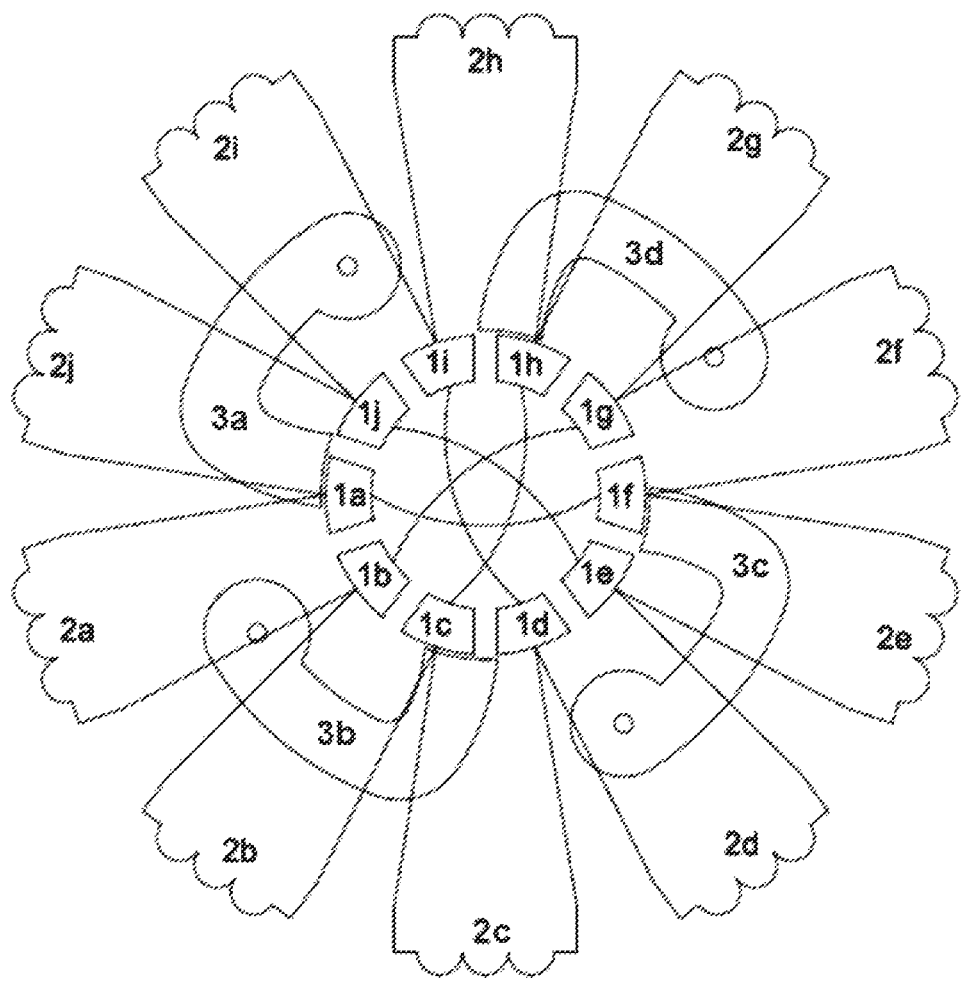
FIG. 6 shows a schematic representation of the sub-coil interconnection of a four-pole brush-commutated DC electric motor according to a third embodiment of the present disclosure.

FIG. 6 finally shows a modification of the embodiment of FIG. 4. The pairs of sub-coils are here not connected in series, but in parallel.

LIST OF REFERENCE NUMERALS

1a to 1j collector segments
2a to 2j sub-coils
3a to 3d brushes
4 brush-commutated DC electric motor
5 stator
6 permanent magnet
7 rotor
8 hollow-cylindrical iron-free winding
9 axis
10 collector
11 sleeve
12 shaft
13 flange
14 flange (brush cover)
15 ball bearing
16 housing (magnetic return)

What is claimed is:

1. A brush-commutated DC electric motor having a stator comprising a permanent magnet, having a number p of pole pairs, and having a rotor rotatable with respect to the stator, which has a hollow-cylindrical iron-free winding with a geometric axis and a number Q of sub-coils, and a collector with a number K of collector segments, wherein the sub-coils are arranged distributed over the periphery of the rotor, and wherein the brush-commutated DC electric motor furthermore has at least one pair of brushes which are in contact with the collector and by means of which the sub-coils are energized, wherein the arrangement of the brushes and the interconnection of the sub-coils are selected in such a way that in each case a number n≥2 of sub-coils, which are each arranged offset by 360°/n in a rotationally symmetrical manner with respect to the axis of the rotor, are always supplied with the same current at the same time, wherein the number p of pole pairs is greater 1, wherein the collector has a number K=k·p of collector segments, wherein k is an uneven number ≥3, wherein the number Q of sub-coils is q·p, wherein the number q either corresponds to the number k or to the double of the number k, and wherein the number n of the sub-coils which are each arranged in a rotationally symmetrical manner with respect to each other and are each energized at the same time corresponds to the number p, if q=k, or the double of p, if q=2·k, and wherein a number p of collector segments, which are also each arranged offset by 360°/p in a rotationally symmetrical manner with respect to the axis of the rotor, are connected to each other in a conductive manner on the rotor side.

2. The brush-commutated DC electric motor according to claim 1, wherein the sub-coils have a uniform shape at least in a projection onto an envelope of the hollow-cylindrical iron-free winding.

3. The brush-commutated DC electric motor according to claim 1, wherein the n sub-coils which are each arranged in a rotationally symmetrical manner with respect to each other and are always energized at the same time are connected in series.

4. The brush-commutated DC electric motor according to claim 1, wherein the n sub-coils which are each arranged in a rotationally symmetrical manner with respect to each other and are always energized at the same time are connected in parallel.

5. The brush-commutated DC electric motor according to claim 1, wherein the number p of pole pairs is 1, wherein the collector (10) has an uneven number K≥3 of collector segments which are each arranged in a rotationally symmetrical manner with respect to each other and are always energized at the same time is 2.

6. The brush-commutated DC electric motor according to claim 5, wherein each sub-coil is connected to a collector segment at one end, and to the diametrically opposed sub-coil at the respective other end.

7. The brush-commutated DC electric motor according to claim 1, wherein the two brushes of the pair of brushes each have a width corresponding to the sum of half a collector pitch and the distance between two collector segments, wherein the two brushes are arranged such that the beginning of the commutation process of the one brush of the pair occurs simultaneously with the termination of the commutation process of the respective other brush of the pair.

8. The brush-commutated DC electric motor according to claim 1, wherein the pair of brushes is a first pair of brushes, wherein the brush-commutated DC electric motor furthermore comprises at least one further pair of brushes which are also in contact with the collector, wherein the two brushes of the further pair of brushes each have a width that is smaller than the width of the brushes of the first pair of brushes.

9. The brush-commutated DC electric motor according to claim 8, wherein the brushes of the at least one further pair of brushes consist of a material which has a higher conductance than the materials of which the brushes of the first pair of brushes consist.

10. The brush-commutated DC electric motor according to claim 1, wherein all sub-coils have the same shapes.

11. The brush-commutated DC electric motor according to claim 1, wherein the sub-coils are designed to be chorded and/or chamfered with respect to the axis of the rotor.

* * * * *